US012749324B2

(12) United States Patent
Cheng

(10) Patent No.: US 12,749,324 B2
(45) Date of Patent: Sep. 29, 2026

(54) SYSTEM AND METHOD FOR AUTHENTICATION OF ANTIQUE PORCELAIN

(71) Applicant: Sean Cheng, West Covina, CA (US)

(72) Inventor: Sean Cheng, West Covina, CA (US)

( * ) Notice: Subject to any disclaimer, the term of this patent is extended or adjusted under 35 U.S.C. 154(b) by 89 days.

(21) Appl. No.: 19/039,150

(22) Filed: Jan. 28, 2025

(65) Prior Publication Data

US 2025/0252759 A1 Aug. 7, 2025

Related U.S. Application Data

(60) Provisional application No. 63/549,699, filed on Feb. 5, 2024.

(51) Int. Cl.

*G06V 20/69* (2022.01)
*G02B 21/36* (2006.01)
*G06V 10/44* (2022.01)
*G06V 10/54* (2022.01)

(52) U.S. Cl.

CPC ......... *G06V 20/695* (2022.01); *G02B 21/365* (2013.01); *G06V 10/44* (2022.01); *G06V 10/54* (2022.01); *G06V 20/693* (2022.01)

(58) Field of Classification Search

CPC ...... G06V 20/695; G06V 10/44; G06V 10/54; G06V 20/693; G02B 21/365

See application file for complete search history.

(56) References Cited

U.S. PATENT DOCUMENTS

| | | | | |
|---|---|---|---|---|
| 8,134,133 | B1 | 3/2012 | Walley | |
| 2003/0117620 | A1 | 6/2003 | Balas | |
| 2004/0141320 | A1 | 7/2004 | Bock | |
| 2007/0274455 | A1 | 11/2007 | Tarawneh | |
| 2008/0037018 | A1 | 2/2008 | Hoffmann | |
| 2024/0255527 | A1* | 8/2024 | Ozcan | G06T 7/0012 |

OTHER PUBLICATIONS

CN 104155296 A and its English translation (Year: 2014).*
CN 111160145 A and its English translation (Year: 2020).*

* cited by examiner

*Primary Examiner* — Chih-Cheng Kao
(74) *Attorney, Agent, or Firm* — Brennan, Manna & Diamond, LLC

(57) ABSTRACT

The present invention is a method and system for authenticating antique porcelain (i.e., antique Chinese porcelain) using a portable handheld electronic microscope and an electronic computing device. The method involves capturing magnified images of a porcelain item and analyzing the images to identify twelve predefined features indicative of antique porcelain. These features include aging and whitening of glaze bubbles, three-dimensional bubble distribution, significant bubble size variations, filamentous bubble patterns, snowflake patterns, blackened bubbles, granular texture of pigments, clam-shell reflection in pigments, wrinkles and cracks, sunken cobalt pigment areas, patina formation, and crazing with staining. The system determines the porcelain item to be antique if at least four of the twelve features are detected.

20 Claims, 15 Drawing Sheets

1102

SYSTEM AND METHOD FOR AUTHENTICATION OF ANTIQUE PORCELAIN

CROSS-REFERENCE TO RELATED APPLICATION

The present application claims priority to, and the benefit of, U.S. Provisional Application No. 63/549,699 which was filed on Feb. 5, 2024 and is incorporated herein by reference in its entirety.

FIELD OF THE INVENTION

The present invention generally relates to methods and systems for identifying and authenticating antique artifacts. More specifically, the invention relates to a portable system for authenticating antique porcelain (i.e., antique Chinese porcelain) by utilizing advanced microscopic imaging and predefined features unique to porcelain over 120 years old. The system comprises a portable handheld electronic microscope paired with an electronic computing device, such as a smartphone, via wireless communication. The microscope captures high-resolution images of the porcelain's surface, enabling detailed analysis of its structural and compositional characteristics. The system further includes a software application that analyzes these images to detect predefined features such as glaze bubbles, pigment patterns, and surface textures. Accordingly, the present disclosure makes specific reference thereto. Nonetheless, it is to be appreciated that aspects of the present invention are also equally applicable to other like applications, devices, and methods of manufacture.

BACKGROUND

By way of background, porcelain serves as a canvas for artistic expression, showcasing the skills of Chinese artisans. Porcelain holds both cultural and commercial value. However, identifying and authenticating ancient Chinese porcelain has long been a complex and challenging task, even for experienced historians and experts. Traditional methods rely heavily on personal experience, intuition, and subjective judgment, which can vary widely among individuals. The lack of consistency often leads to disagreements and potential inaccuracies in the authentication process. Moreover, the traditional approaches are prone to bias and emotional influence, further complicating objective evaluation.

Currently, there is no commonly accepted or standardized procedure to assess and/or authenticate antique porcelain using clear, measurable, and objective criteria. The absence of such guidelines creates significant challenges in distinguishing genuine antique pieces from modern reproductions or counterfeits. People desire a reliable and systematic method to provide accurate identification of antique porcelain, reducing reliance on personal judgment.

Therefore, there exists a long-felt need in the art for a reliable and efficient method to identify and authenticate antique porcelain (i.e., antique Chinese porcelain), particularly those over 120 years old. There is a long-felt need for a standardized solution that eliminates reliance on subjective judgment. Additionally, there is a long-felt need for a user-friendly, cost-effective system that can be utilized to accurately distinguish genuine antique porcelain from modern reproductions. Furthermore, there is a long-felt need for a method that leverages microscopic analysis to detect unique features of antique porcelain. More specifically, there exists a long-felt need in the art for a portable and accessible device that integrates with modern smartphones, enabling users to perform detailed examinations using advanced imaging technology. Finally, there is a long-felt need for a system that provides reliable, reproducible results based on the presence of predefined, verifiable features, ensuring a high level of confidence in determining authenticity.

The subject matter disclosed and claimed herein, in one embodiment, comprises an innovative method and system for identifying and authenticating antique porcelain (i.e., antique Chinese porcelain). The invention utilizes a portable handheld electronic microscope, which can be paired with a smartphone via wireless communication. The microscope captures high-resolution images of porcelain surfaces, enabling detailed examination of unique microscopic features. The system includes a software application that analyzes these images to detect twelve predefined features indicative of antique porcelain, such as aging and whitening of glaze bubbles, three-dimensional bubble distribution, and filamentous patterns in the glaze. The system authenticates porcelain as antique when at least four of the twelve features are identified.

In this manner, the invention fulfills the aforementioned needs by providing a portable, accessible, and efficient solution for authenticating antique porcelain (i.e., antique Chinese porcelain). The system eliminates the need for professional expertise by offering a standardized method based on measurable criteria. By leveraging advanced imaging and software analysis, the device ensures objective and reproducible results, reducing the risk of misidentification. The invention is user-friendly, compact, and suitable for a wide range of users, from collectors and appraisers to museums and historians. The system includes 12 microscopic signals or factors exclusively found in antique porcelain (i.e., antique Chinese porcelain) from the specified age range. The system offers an objective, unbiased method of identifying ancient Chinese porcelain.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a method for identifying and authenticating antique porcelain (i.e., antique Chinese porcelain). The method includes the steps of pairing a portable handheld electronic microscope with an electronic computing device via wireless communication, activating the microscope for capturing close-up images of a porcelain item, positioning the microscope's lens directly over a surface of the porcelain item to capture structural and compositional details, displaying a live feed from the microscope on the electronic computing device using a software application, adjusting the focus of the microscope to clearly view glaze bubbles, surface features, and pigment details of the porcelain item, and analyzing the captured images to identify at least four of a plurality of predetermined features indicative of antique porcelain, wherein the identified features authenticate the porcelain item as antique.

In one embodiment, a system for authenticating antique porcelain (i.e., antique Chinese porcelain) is described. The device system includes a portable handheld electronic microscope configured to capture magnified images of porcelain surfaces, an electronic computing device communicatively connected to the microscope via wireless communication, the device includes a software application configured to analyze images of the porcelain item for at least four of a plurality of features indicative of antique porcelain, the microscope is further configured to adjust focus and tilt by approximately 20 to 40 degrees for enhanced imaging of glaze bubbles, surface features, and pigment composition.

In still another embodiment, a method for determining the authenticity of porcelain items is described. The method comprises using a portable handheld electronic microscope to magnify surface details of a porcelain item, capturing images of the porcelain surface, including glaze bubbles, pigments, and structural features, analyzing the captured images using a software application to identify the presence of features associated with antique porcelain, the features comprising at least aging and whitening of glaze bubbles, three-dimensional bubble distribution, variation in bubble sizes, filamentous bubble patterns, and granular texture of pigments, and authenticating the porcelain item as antique when at least four of the identified features are present.

In yet another embodiment, the software application receives and displays live feed images from the microscope, analyzes the images to identify structural and compositional features of the porcelain, and determine authenticity based on the identification of at least four features associated with antique porcelains.

In still another embodiment, a method for authenticating antique porcelain (i.e., antique Chinese porcelain) is described. The method includes using a portable handheld electronic microscope paired with an electronic computing device to capture magnified images of a porcelain item, analyzing the images to identify the presence of twelve predefined features associated with antique porcelain, the features comprising aging and whitening of glaze bubbles, three-dimensional bubble distribution, significant size variations in bubbles, filamentous bubble patterns, snowflake patterns from whitening bubbles, blackened bubbles, granular texture of glaze and pigments, clam-shell reflection in pigments, wrinkles and cracks on the surface, sunken cobalt pigment areas, patina on the surface, and crazing and staining of the glaze, and determining the porcelain item to be antique when at least four of the twelve features are present.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
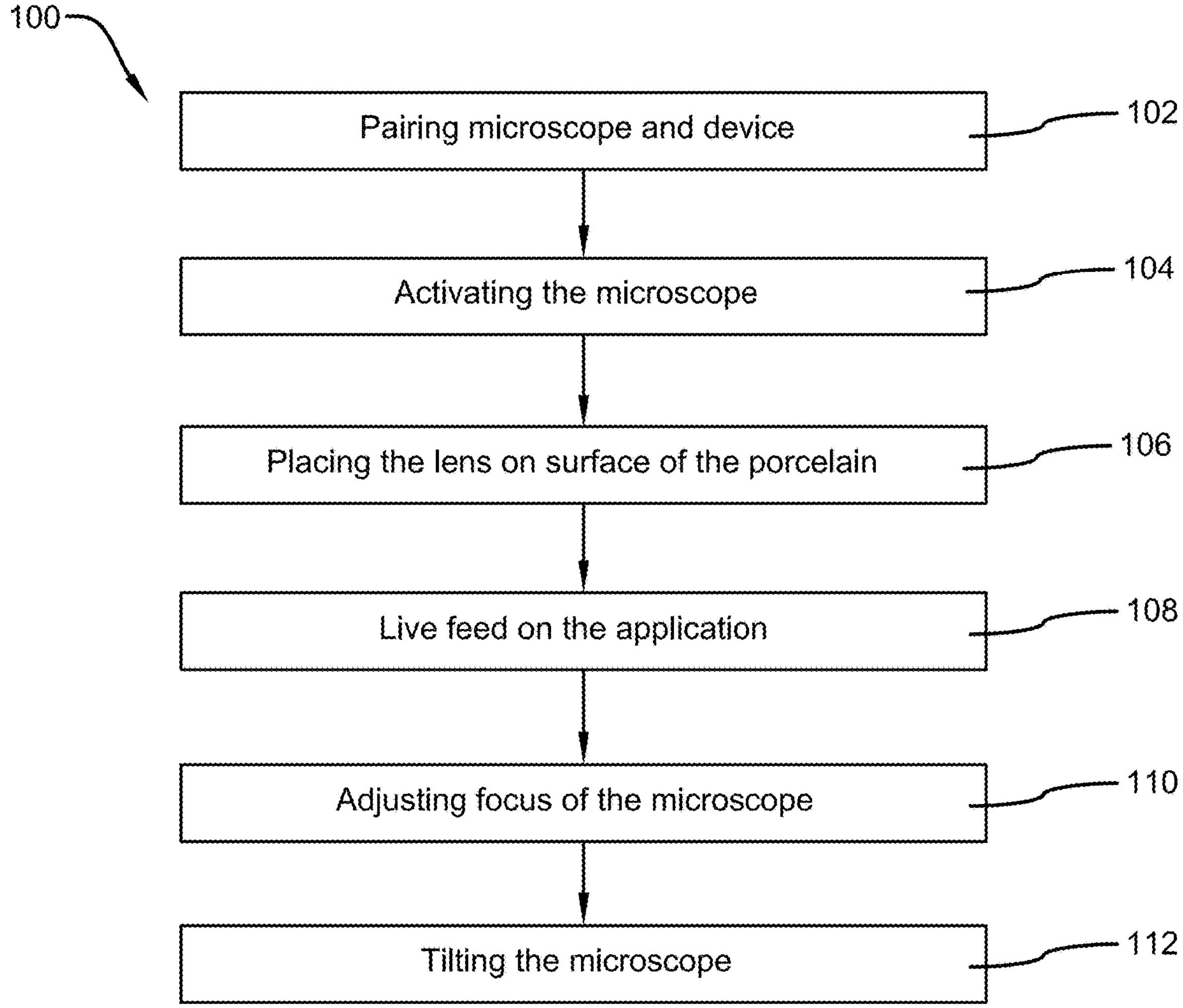
FIG. 1 illustrates a flow chart depicting a process of identifying and authenticating antique porcelain (i.e., antique Chinese porcelain) in accordance with one embodiment of the present invention.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown.

Thus, in other embodiments, any of the features described herein from different embodiments may be combined.

As noted above, there exists a long-felt need in the art for a reliable and efficient method to identify and authenticate antique porcelain (i.e., antique Chinese porcelain), particularly those over 120 years old. There is a long-felt need for a standardized solution that eliminates reliance on subjective judgment. Additionally, there is a long-felt need for a user-friendly, cost-effective system that can be utilized to accurately distinguish genuine antique porcelain from modern reproductions. Furthermore, there is a long-felt need for a method that leverages microscopic analysis to detect unique features of antique porcelain. More specifically, there exists a long-felt need in the art for a portable and accessible device that integrates with modern smartphones, enabling users to perform detailed examinations using advanced imaging technology. Finally, there is a long-felt need for a system that provides reliable, reproducible results based on the presence of predefined, verifiable features, ensuring a high level of confidence in determining authenticity.

The present invention, in one exemplary embodiment, is a method for identifying and authenticating antique porcelain (i.e., antique Chinese porcelain). The method includes the steps of pairing a portable handheld electronic microscope with an electronic computing device via wireless communication, activating the microscope for capturing close-up images of a porcelain item, positioning the microscope's lens directly over a surface of the porcelain item to capture structural and compositional details, displaying a live feed from the microscope on the electronic computing device using a software application, adjusting the focus of the microscope to clearly view glaze bubbles, surface features, and pigment details of the porcelain item, and analyzing the captured images to identify at least four of a plurality of predetermined features indicative of antique porcelain, wherein the identified features authenticate the porcelain item as antique.

Reference will now be made in detail to the present preferred embodiments of the invention, examples of which are illustrated in the accompanying drawings. Wherever possible, the same reference numerals are used in the drawings and the description to refer to the same or like parts.

Referring initially to the drawings, FIG. 1 illustrates a flow chart depicting a process of identifying and authenticating antique porcelain (i.e., antique Chinese porcelain) in accordance with one embodiment of the present invention. The method 100 can be performed by individuals with or without any professional assistance and uses the device for identifying and authenticating antique porcelain microscopic signals or factors that are unique to porcelain made during a specified period, preferably porcelain which is more than 120 years old. Initially, a portable handheld electronic microscope is paired with an electronic computing device such as a smartphone using a wireless communication technology such as Wi-Fi (Step 102). Then, the microscope is activated for close-up imaging of a porcelain item (Step 104). Thereafter, lens of the microscope is placed directly over the surface of the porcelain item for optimal imaging (Step 106). Then, a corresponding software application in the smartphone is activated and the application displays the live feed from the microscope for review by a user (Step 108). For effective review, focus of the microscope can be adjusted to clearly view various details such as glaze bubbles, surface features, and more (Step 110). Finally, the microscope lens is positioned strategically by tilting the microscope lens to about 20 to 40 degrees relative to the porcelain item to analyze the glaze and pigment composition of the porcelain item for determining authenticity of the porcelain item (Step 112).

Figure 2:
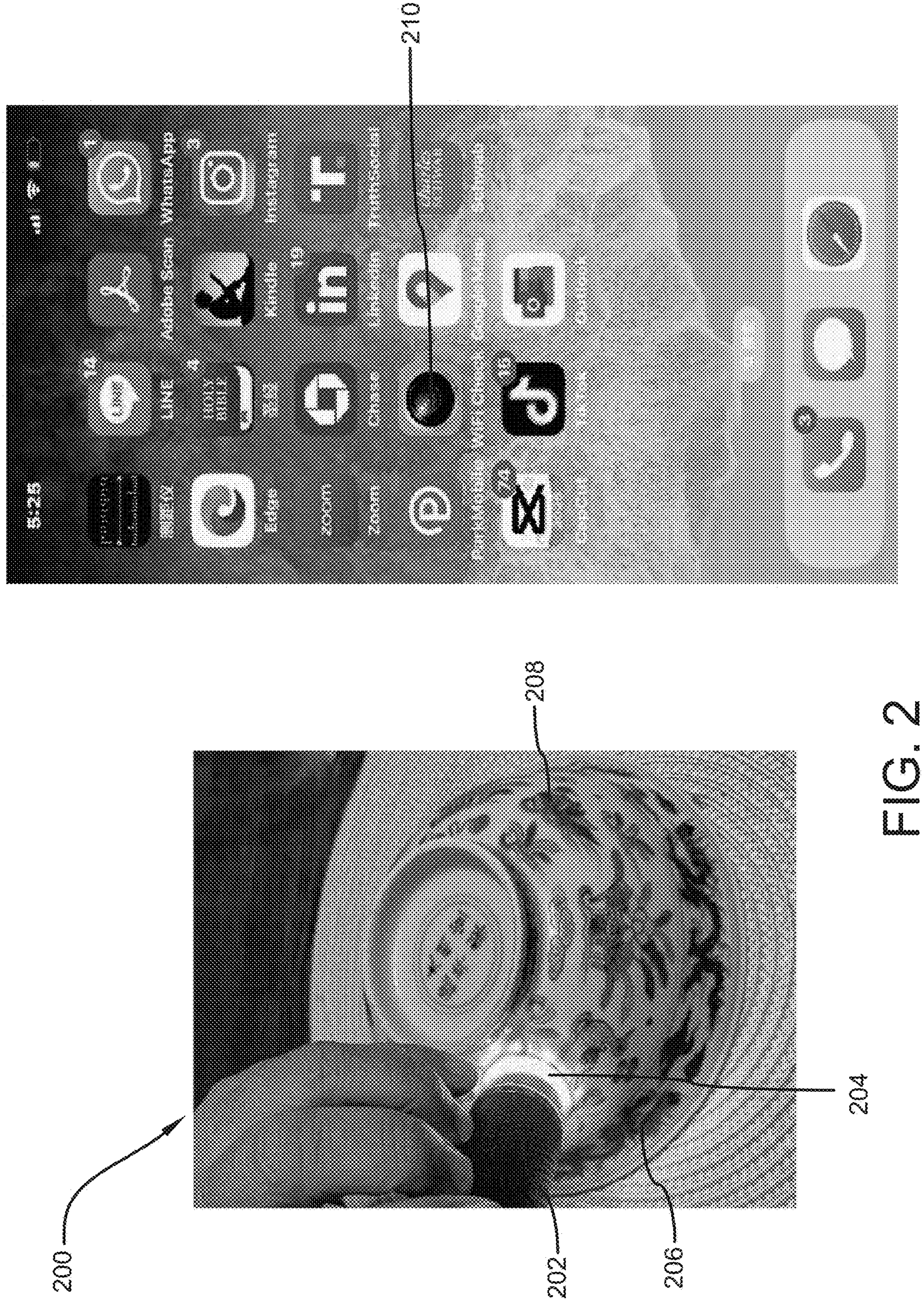
FIG. 2 illustrates a perspective view showing use of the electronic microscope over the surface of the porcelain item in accordance with one embodiment of the present invention.

FIG. 2 illustrates a perspective view showing use of the electronic microscope over the surface of the porcelain item in accordance with one embodiment of the present invention. In the present invention, the system 200 includes any conventional portable electronic microscope 202 can be used and the lens 204 can be placed on the surface 206 of the porcelain item 208. When the microscope 202 is activated, the microscope 202 displays various structural elements of the porcelain item 208 and the application 210 displays the microscope captured image as illustrated in FIG. 3 for review by a user.

Figure 3:
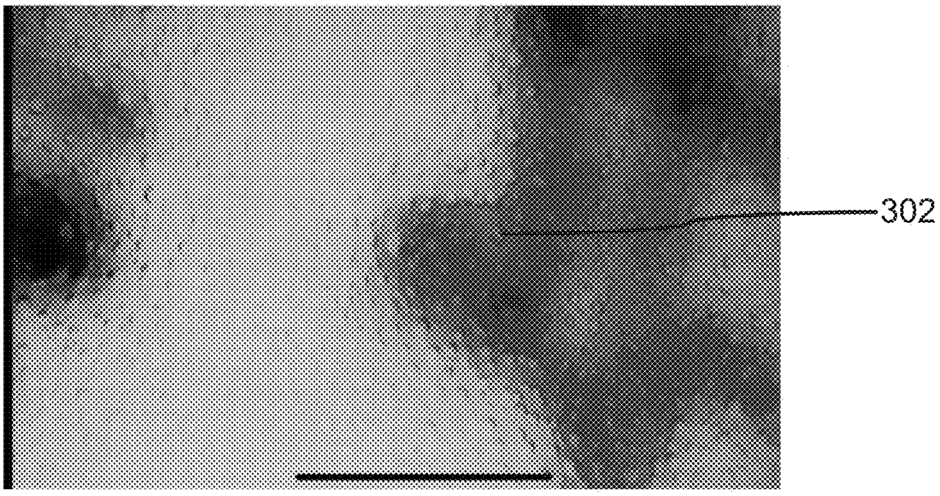
FIG. 3 illustrates an exemplary user interface of the application installed in the smartphone displaying captured image by the microscope in accordance with the disclosed structure.

FIG. 3 illustrates an exemplary user interface of the application installed in the smartphone displaying captured image by the microscope in accordance with the disclosed structure. As illustrated, the interface 302 displays the glaze bubbles 304 and other structural features of the porcelain item 208 for reviewer to review in order to assess and/or authenticate the age and quality of the porcelain item.

In the preferred embodiment, using the microscope 202 and the application, twelve different features of the porcelain items can be reviewed for determining authenticity of the porcelain items and when at least 4 out of the 12 features are ascertained/present/determined, the porcelain is determined to be antique. If less than 4 features are present, then the porcelain is determined to be recent or counterfeit.

Figure 4A:
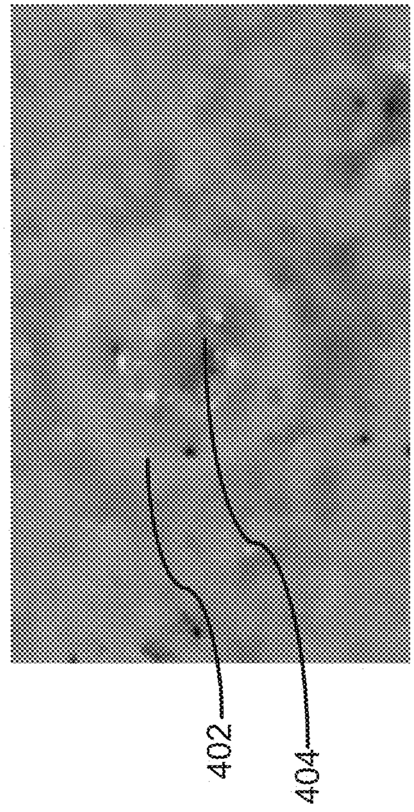
FIGS. 4A and 4B illustrate whitening of glaze in antique porcelain and recent porcelain respectively.
Figure 4B:
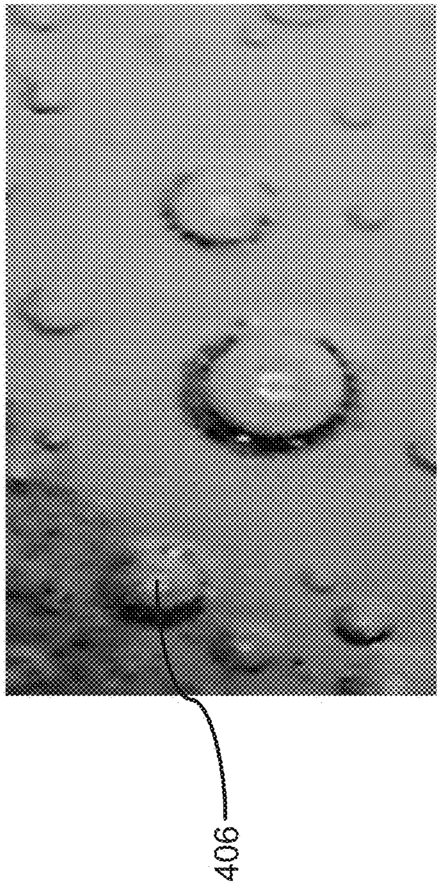

Referring now to FIGS. 4A-4B, various features of determining antique porcelain items are disclosed. FIGS. 4A and 4B illustrate whitening of glaze in antique porcelain and recent porcelain, respectively. One of the twelve features is aging and whitening and as porcelain ages, the microscopic bubbles trapped within the glaze undergo changes and the bubbles rupture over time and absorb impurities, thereby creating a phenomenon known as "whitening." Whitening is present in antique porcelain as illustrated in FIG. 4A and hazy, grayish-white bands 402 surround the base 404 of the bubbles. The bubbles develop irregular "notches," and resemble human eyeballs. The whitening effect represents gradual disintegration of the glaze's crystal structure and is not present in modern porcelain. Bubbles 406 in the new porcelain as illustrated in FIG. 4B are clean, transparent, and free from cloudiness.

Figure 5B:
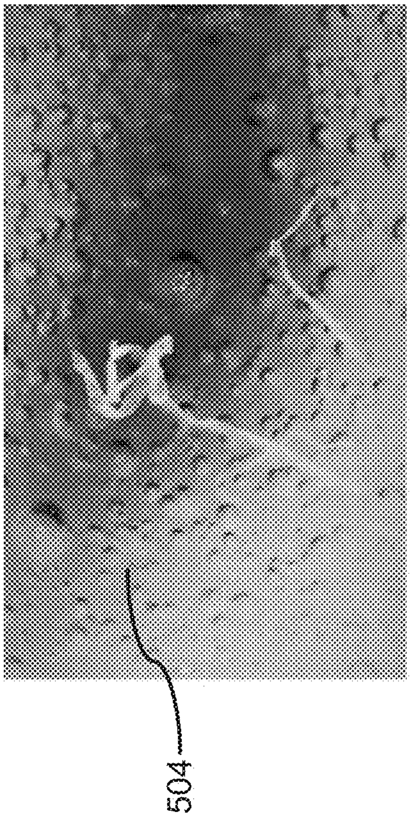
FIGS. 5A and 5B illustrate the images corresponding to second feature Three-Dimensional "Bottom-to-Top" Bubble Distribution to differentiate the antique porcelain and the new porcelain.
Figure 5A:
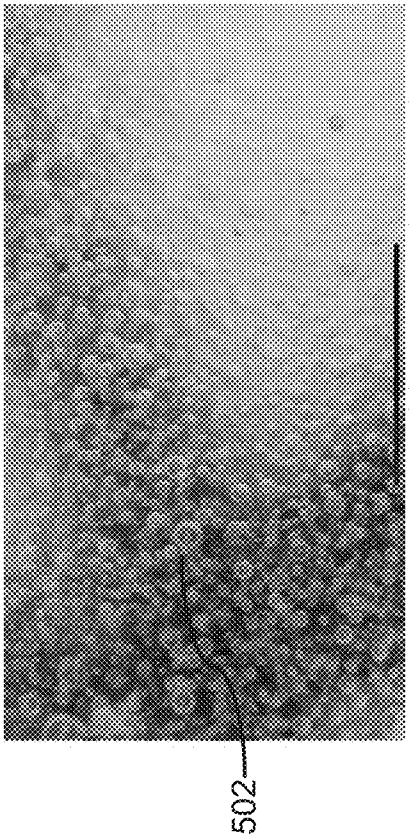

FIGS. 5A and 5B illustrate the images corresponding to second feature Three-Dimensional "Bottom-to-Top" Bubble Distribution to differentiate the antique porcelain and the new porcelain. In old or antique porcelain, bubbles within the glaze are arranged in a unique three-dimensional structure, like "clusters of grapes." In the antique porcelain, the bubbles form a stratified pattern 502 and grow larger as they ascend toward the surface of the porcelain item. The distribution of the bubbles results from the slow heating in wood-fired kilns, where bubbles rise and solidify at varying sizes. As illustrated in FIG. 5B, in modern porcelain, bubbles appearing on a single, flat plane 504 as the modern porcelain is fired in gas or electric kilns with rapid heating.

Figure 6A:
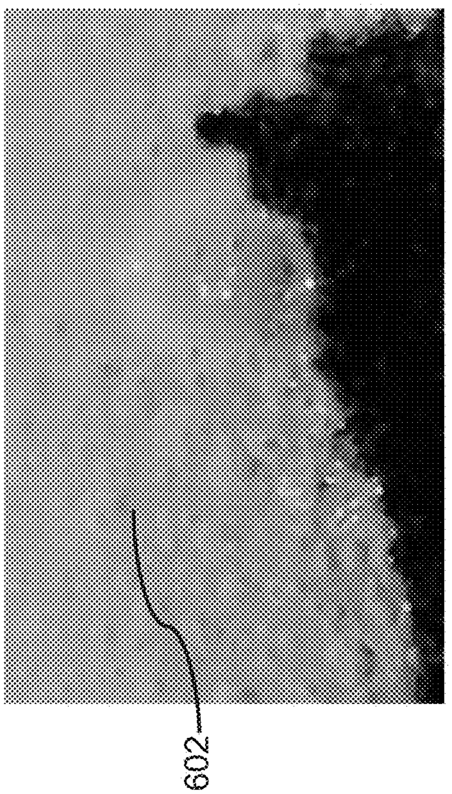
FIGS. 6A and 6B illustrate the images corresponding to third feature of bubbles size variation to differentiate the antique porcelain and the new porcelain.
Figure 6B:
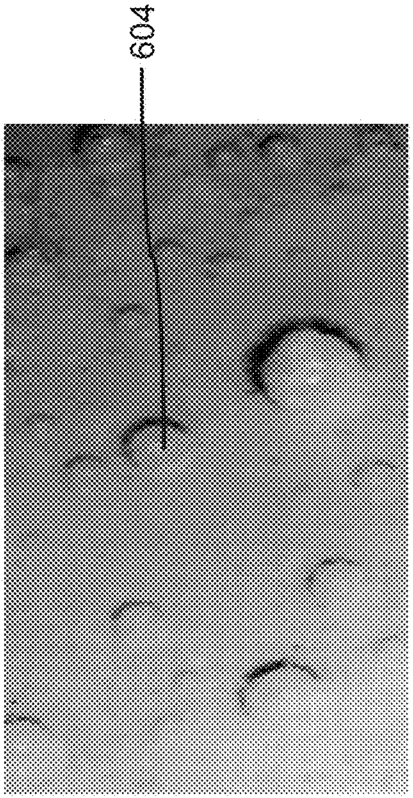

FIGS. 6A and 6B illustrate the images corresponding to third feature of bubbles size variation to differentiate the antique porcelain and the new porcelain. The bubbles 602 in the antique porcelain are of varying sizes, with the largest bubbles being from ten to fourteen times larger than the smallest bubbles in the porcelain. The variation in the bubbles size is due to uneven temperature distribution and slow heating in traditional wood-fired kilns. As illustrated in FIG. 6B, the new porcelain has uniformly sized bubbles 604.

Figure 7B:
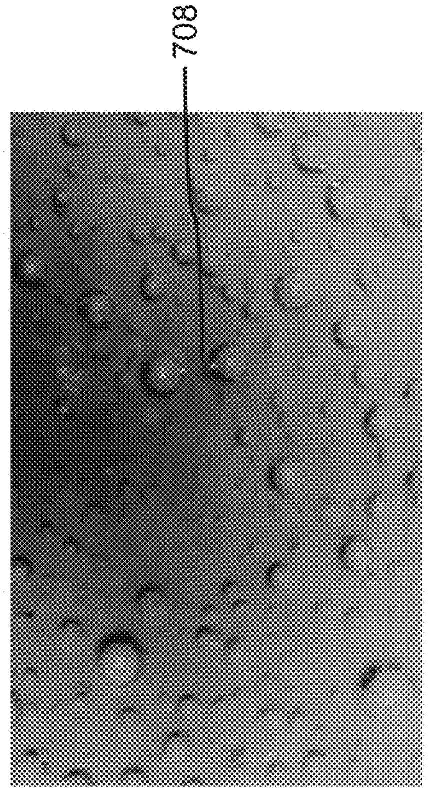
FIGS. 7A and 7B illustrate the images corresponding to the fourth feature of filamentous bubbles to differentiate the antique porcelain and the new porcelain.
Figure 7A:
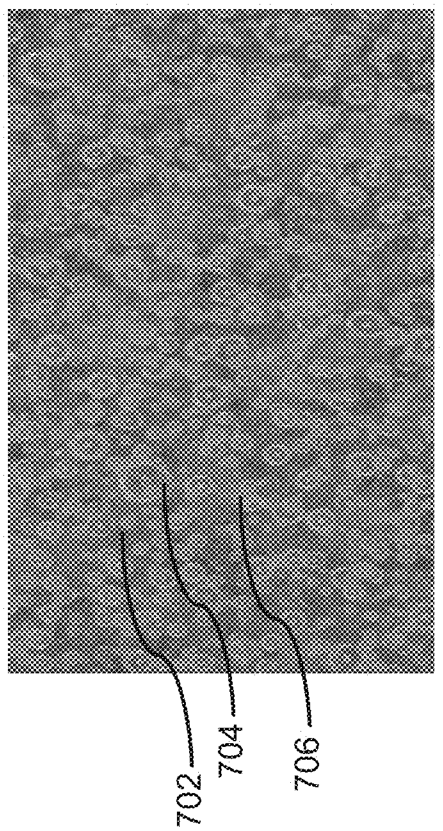

FIGS. 7A and 7B illustrate the images corresponding to the fourth feature of filamentous bubbles to differentiate the antique porcelain and the new porcelain. In the aged or antique porcelain, bubbles form a filamentous pattern 702 which resembles strands of syrup or saliva. Specifically, the larger bubbles 704 are frequently followed by strings of interconnected smaller bubbles 706. The interconnectedness results from the aging and natural cooling of the glaze. As illustrated in FIG. 7B, in new porcelain, bubbles 708 are isolated and exist as solitary entities without the filamentous trails.

Figure 8B:
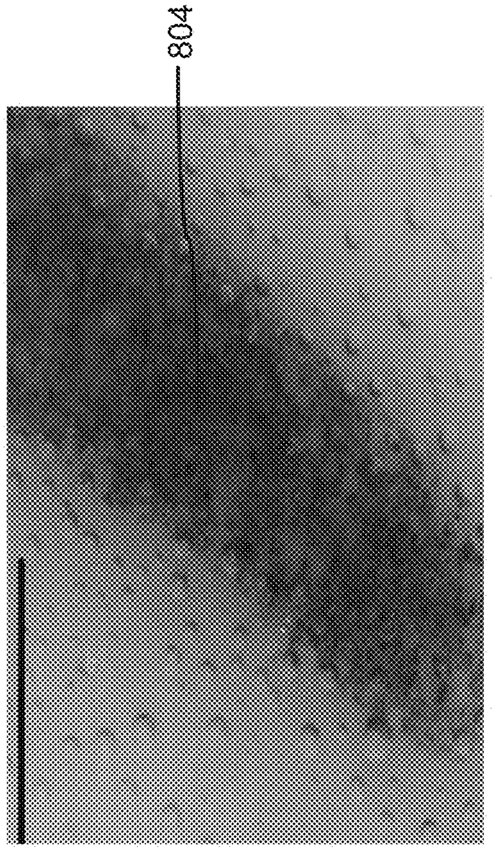
FIGS. 8A and 8B illustrate the images corresponding to the fifth feature of snowflake patterns to differentiate the antique porcelain and the new porcelain.
Figure 8A:
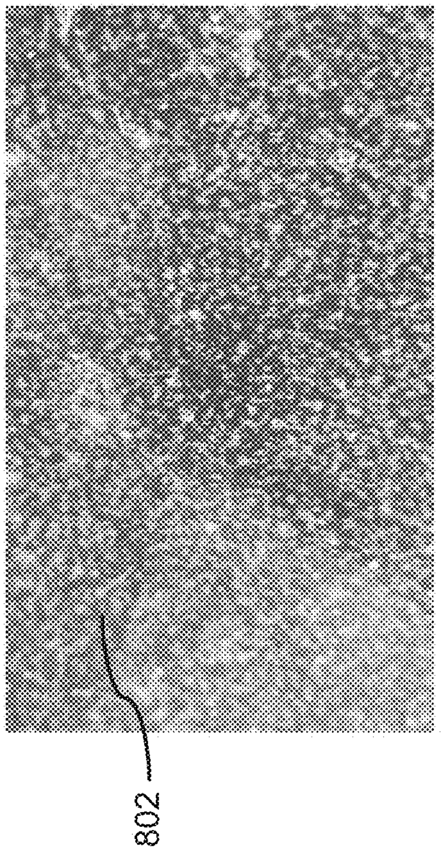

FIGS. 8A and 8B illustrate the images corresponding to the fifth feature of snowflake patterns to differentiate the antique porcelain and the new porcelain. As more bubbles in old porcelain rupture and whiten, the bubbles form snowflake-like white spots 802 on the surface of the glaze. In the antique porcelain, over time, the snowflake patterns 802 become increasingly abundant and dense, creating a soft, diffuse reflection of light. The snowflake pattern gives old porcelain a "buttery sheen" and a uniquely textured aesthetic. As illustrated in FIG. 8B, in modern porcelain, bubbles 804 do not create a snowflake-like pattern.

Figure 9B:
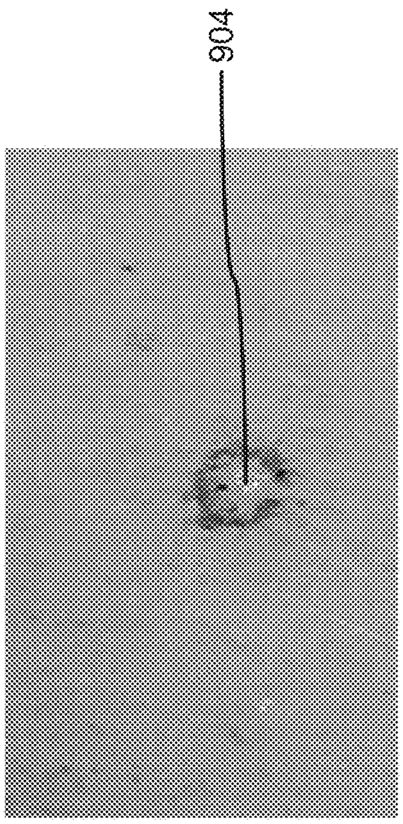
FIGS. 9A and 9B illustrate the images corresponding to the sixth feature of blackened bubbles to differentiate the antique porcelain and the new porcelain.
Figure 9A:
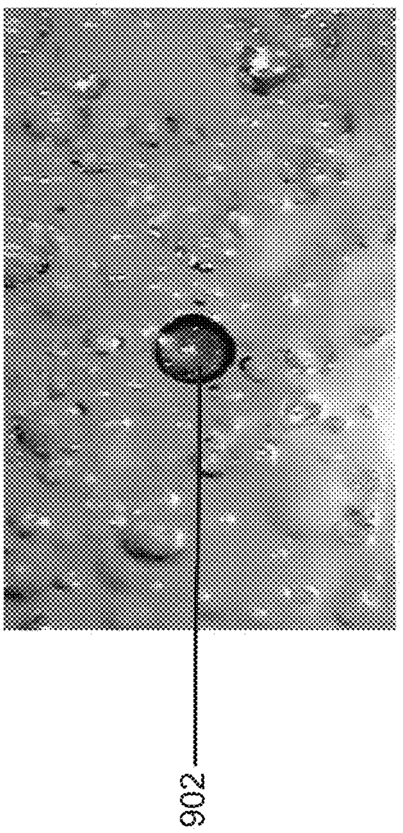

FIGS. 9A and 9B illustrate the images corresponding to the sixth feature of blackened bubbles to differentiate the antique porcelain and the new porcelain. In antique porcelain such as porcelain, which is over a century old, some bubbles appear blackened (illustrated by numerical 902) due to the accumulation of oxidized substances, oils, or dust. The blackened bubbles can be caused due to the porcelain being heavily used or exposed to environmental factors. The blackened appearance gives the glaze surface a mole-like texture. In new porcelain or in finely preserved antiques such as excavated or water-recovered items, blackened bubbles are absent, and the bubbles 904 can be of any other colors.

Figure 10B:
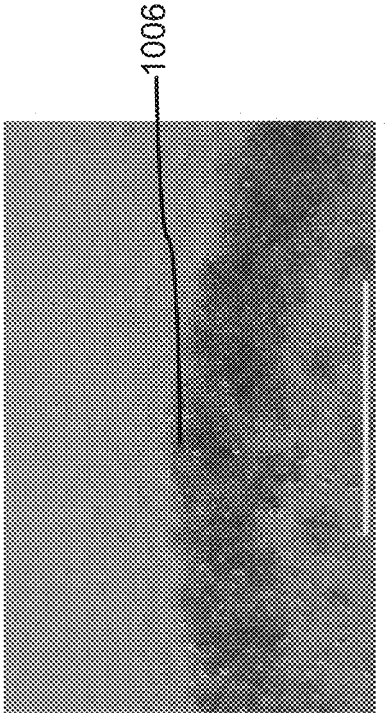
FIGS. 10A and 10B illustrate the images corresponding to the seventh feature of granular texture of glaze and pigments to differentiate the antique porcelain and the new porcelain.
Figure 10A:
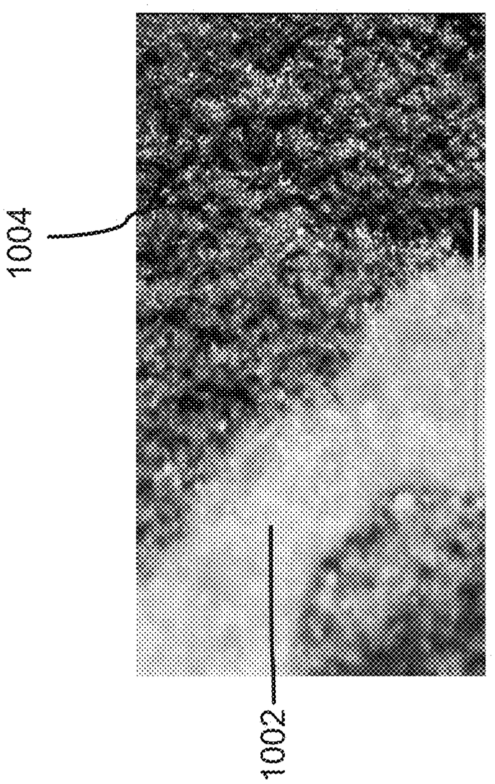

FIGS. 10A and 10B illustrate the images corresponding to the seventh feature of granular texture of glaze and pigments to differentiate the antique porcelain and the new porcelain. The glaze 1002 and the pigments 1004 in old porcelain exhibit a rough, granular texture when viewed under the microscope. The texture results from the use of hand-ground mineral raw materials, which were unevenly ground. The granules give old porcelain a vibrant and textured look. As illustrated in FIG. 10B, in modern porcelain, machine-ground pigments produce smooth, uniform particles 1006 and lack the uneven, coarse quality of older materials.

Figure 11B:
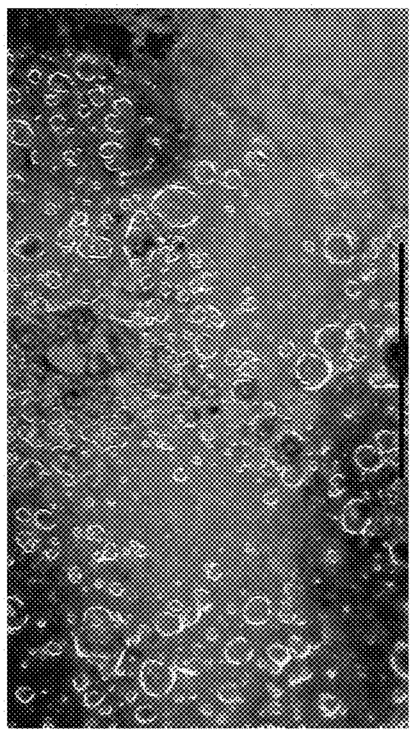
FIGS. 11A and 11B illustrate the images corresponding to the eighth feature of clam-shell reflection in pigments to differentiate the antique porcelain and the new porcelain.
Figure 11A:
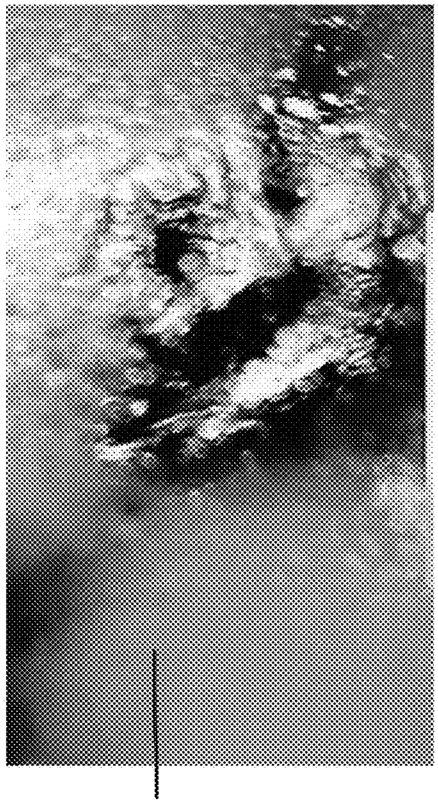

FIGS. 11A and 11B illustrate the images corresponding to the eighth feature of clam-shell reflection in pigments to differentiate the antique porcelain and the new porcelain. Traditional mineral pigments 1102 in the old porcelain, display a unique "clam-shell reflection" which is like a rainbow-like iridescence caused by the oxidation of elements such as magnesium, manganese, and titanium. For example, the clam-shell reflection is visible in Yuan and Ming dynasty blue-and-white porcelain. In modern porcelain, chemical pigments lack the iridescent quality and thus a user can differentiate between the antique and new porcelains.

Figure 12B:
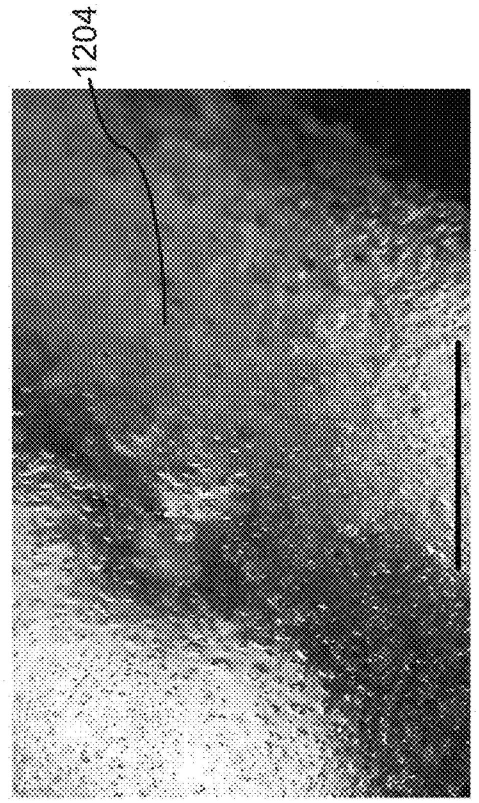
FIGS. 12A and 12B illustrate the images corresponding to the ninth feature of wrinkles and cracks on the surface to differentiate the antique porcelain and the new porcelain.
Figure 12A:

FIGS. 12A and 12B illustrate the images corresponding to the ninth feature of wrinkles and cracks on the surface to differentiate the antique porcelain and the new porcelain. The old porcelain has a plurality of wrinkles and cracks 1202 on its surface, resembling dried, cracked earth or spiderweb-like patterns. Such wrinkles and cracks arise from surface weathering, oils from handling, and the rupture of glaze bubbles over time. The textures are unique to aged porcelain and cannot be replicated in new porcelain, which has a smooth, unbroken glaze 1204 as illustrated in FIG. 12B.

Figure 13A:
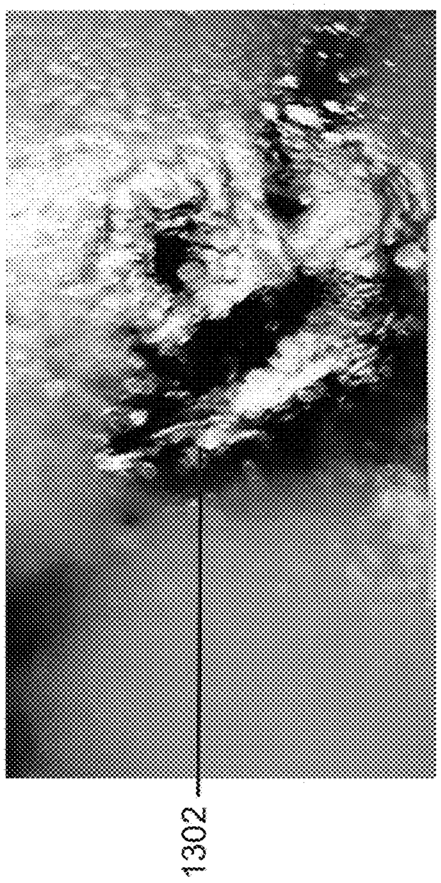
FIGS. 13A and 13B illustrate the images corresponding to the tenth feature of sunken cobalt pigment to differentiate the antique porcelain and the new porcelain.
Figure 13B:
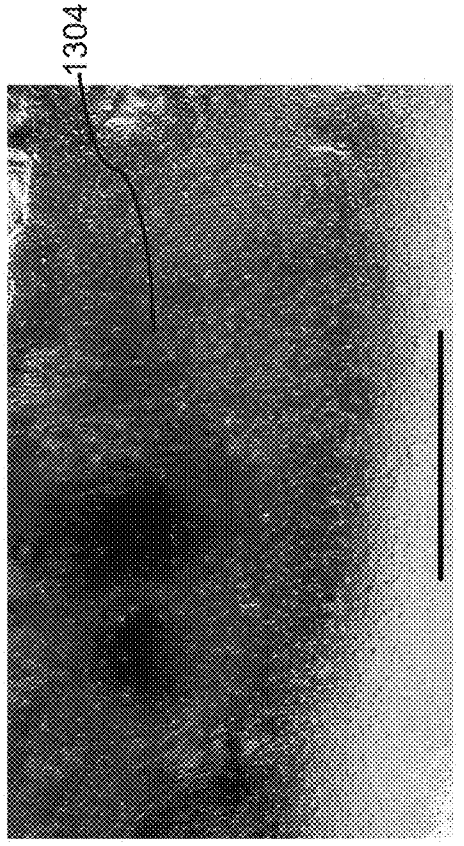

FIGS. 13A and 13B illustrate the images corresponding to the tenth feature of sunken cobalt pigment to differentiate the antique porcelain and the new porcelain. In old porcelain such as blue-and-white porcelain, there are areas with heavy cobalt pigment application which often exhibit a concave or sunken texture 1302 known as "eating into the body." The texture is common in Yuan and Ming dynasty pieces and is most prominent when imported cobalt pigments (e.g., "Sumaliqing") were used. Modern porcelain items have smooth texture 1304 and chemical pigments and techniques lack the sunken texture, thereby providing a clear distinction between the old porcelain and the new porcelain.

Figure 14A:
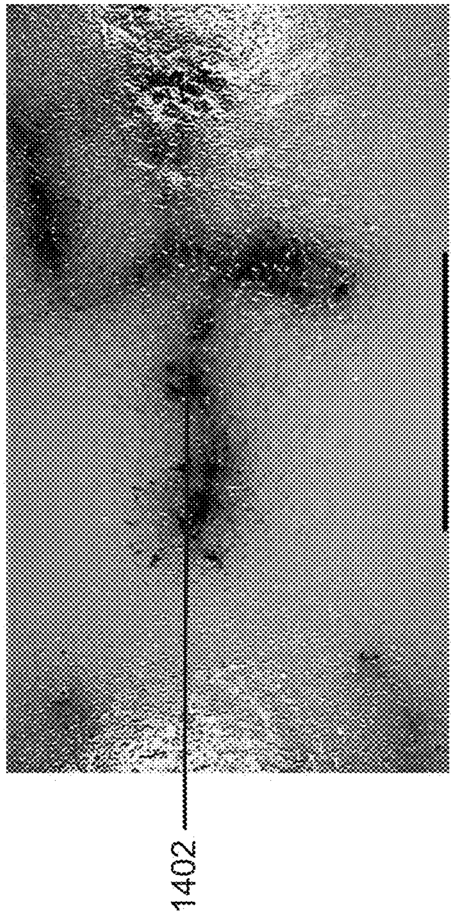
FIGS. 14A and 14B illustrate the images corresponding to the patina to differentiate the antique porcelain and the new porcelain.
Figure 14B:
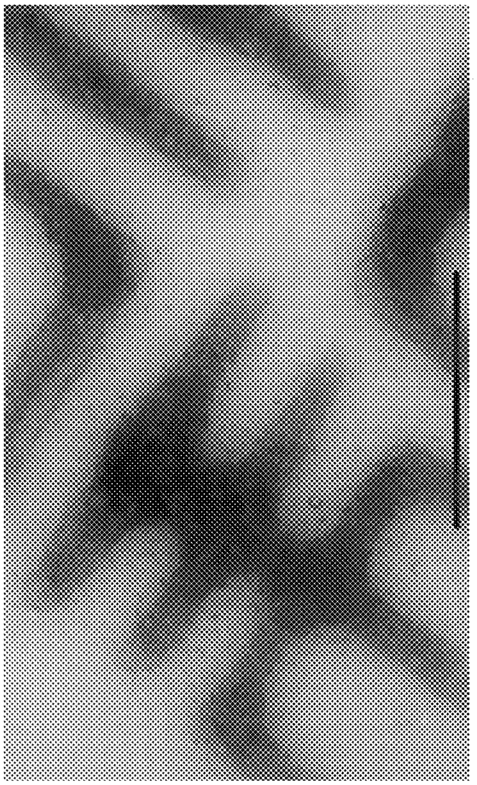

FIGS. 14A and 14B illustrate the images corresponding to the patina to differentiate the antique porcelain and the new porcelain. The surface of old porcelain develops a thin, wax-like coating over time, referred to as "patina" 1402. The patina gives the piece a misty, cloud-like appearance, with pigments appearing slightly blurred at the edges. The modern porcelain lacks the patina, and the pigments remain sharp and tightly adhered to the glaze surface.

Figure 15A:
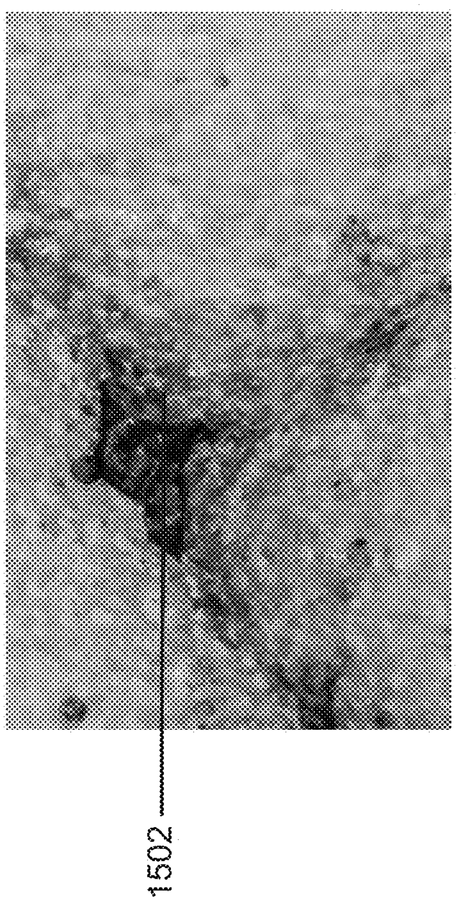
FIGS. 15A and 15B illustrate the images corresponding to crazing and staining in old porcelain to differentiate the antique porcelain and the new porcelain.
Figure 15B:
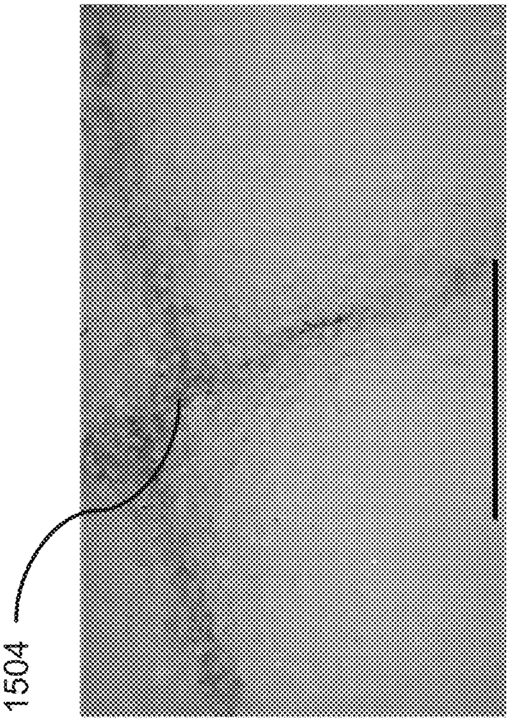

FIGS. 15A and 15B illustrate the images corresponding to crazing and staining in old porcelain to differentiate the antique porcelain and the new porcelain. Crazing refers to fine cracks on the glaze that accumulate substances such as dust, oils, or sweat over time. The debris materials settle into the cracks, forming natural stains 1502 in shades of brown, black, or gray. The staining expands along the crazing network, creating a dynamic, aged appearance. In modern porcelain, imitations 1504 of crazing appear monotonous and artificial, and lack the complexity of naturally aged porcelain.

In some embodiments, the software application includes the built-in capabilities to analyze the images captured by the microscope for the twelve features and determine the authenticity of the old porcelain items. In case, at least four out of the twelve features are determined, then, the application may determine the porcelain item to be an antique porcelain item.

In some embodiments, the application uses artificial intelligence (AI) to train on a set of antique porcelain images and features for analyzing different porcelain items. Further, the application is constantly updated with new features for determining authenticity of the old or antique porcelain.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "portable system and method for authentication of antique porcelain (i.e., antique Chinese porcelain)", "device and method for identifying and authenticating antique porcelain", and "device" are interchangeable and refer to the device and method for identifying and authenticating antique porcelain 100, 200 of the present invention.

Notwithstanding the forgoing, the device and method for identifying and authenticating antique porcelain 100, 200 of the present invention can be of any suitable configuration as is known in the art without affecting the overall concept of the invention, provided that it accomplishes the above stated objectives. One of ordinary skill in the art will appreciate that the device and method for identifying and authenticating antique porcelain 100, 200 as shown in the FIGS. are for illustrative purposes only, and that many other configurations of the device and method for identifying and authenticating antique porcelain 100, 200 are well within the scope of the present disclosure. Although the dimensions of the device and method for identifying and authenticating antique porcelain 100, 200 are important design parameters for user convenience, the device and method for identifying and authenticating antique porcelain 100, 200 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for identifying and authenticating porcelain, the method comprising the steps of:

providing a portable electronic microscope and a lens for assessing a porcelain item;

providing an electronic computing device having a software application; wherein said portable electronic microscope is connected to said electronic computing device with a wireless communication connection;

activating said portable electronic microscope for close-up imaging of said porcelain item;

placing said lens over a surface of said porcelain item;

imaging said porcelain item;

activating said software application;

displaying a live feed from said portable electronic microscope to said electronic computing device;

viewing surface features of said porcelain item; and assessing said porcelain item as an antique porcelain item when ascertaining the presence of at least four features selected from the group of features consisting of aging and whitening of glaze bubbles, three-dimensional bubble distribution, significant size variations in bubbles, filamentous bubble patterns, snowflake patterns from whitening bubbles, blackened bubbles, granular texture of glaze and pigments, clam-shell reflection in pigments, wrinkles and cracks, sunken cobalt pigment areas, patina, and crazing and staining of a glaze.

2. The method for identifying and authenticating porcelain of claim 1, wherein said group of features are surface features of said porcelain item.

3. The method for identifying and authenticating porcelain of claim 1, further comprising a step of focusing said portable electronic microscope to view details of said surface features of said porcelain item.

4. The method for identifying and authenticating porcelain of claim 1, wherein said lens is positioned at an angle from 20 degrees to 40 degrees relative to said porcelain item.

5. The method for identifying and authenticating porcelain of claim 1, wherein said lens is positioned on said surface of said porcelain item.

6. The method for identifying and authenticating porcelain of claim 1, wherein the feature of said aging and whitening of glaze bubbles includes detecting grayish-white bands surrounding a base of said glaze bubbles.

7. The method for identifying and authenticating porcelain of claim 1, wherein the feature of said three-dimensional bubble distribution includes a stratified pattern of said three-dimensional bubble distribution.

8. The method for identifying and authenticating porcelain of claim 1, wherein the feature of said significant size variations in bubbles includes a largest bubble size being from ten to fourteen times a smallest bubble size.

9. The method for identifying and authenticating porcelain of claim 1, wherein the feature of said filamentous bubble patterns includes a string of interconnected bubbles.

10. The method for identifying and authenticating porcelain of claim 1, wherein the feature of said snowflake patterns from whitening bubbles includes white spots on a surface of a glaze of said porcelain item.

11. The method for identifying and authenticating porcelain of claim 1, wherein the feature of said blackened bubbles includes a mole texture on a surface of a glaze of said porcelain item.

12. The method for identifying and authenticating porcelain of claim 1, wherein the feature of said granular texture of glaze and pigments includes an uneven and coarse texture.

13. The method for identifying and authenticating porcelain of claim 1, wherein the feature of said clam-shell reflection in pigments includes an iridescence reflection.

14. The method for identifying and authenticating porcelain of claim 1, wherein the feature of said wrinkles and cracks includes spiderweb-like patterns of cracks.

15. The method for identifying and authenticating porcelain of claim 1, wherein the feature of said sunken cobalt pigment areas includes a concave texture.

16. The method for identifying and authenticating porcelain of claim 1, wherein the feature of said patina includes a cloudy appearance having blurred edges to said pigments.

17. The method for identifying and authenticating porcelain of claim 1, wherein the feature of said crazing and staining of a glaze includes fine cracks having stains to a glaze of said porcelain item.

18. The method for identifying and authenticating porcelain of claim 1, wherein said group of features are surface features of said porcelain item.

19. A method for identifying and authenticating porcelain, the method comprising the steps of:

providing a portable electronic microscope and a lens for assessing a porcelain item;

providing an electronic computing device having a software application; wherein said portable electronic microscope is connected to said electronic computing device with a wireless communication connection;

activating said portable electronic microscope for close-up imaging of said porcelain item;

placing said lens over a surface of said porcelain item;

activating said software application;

displaying a live feed from said portable electronic microscope to said electronic computing device;

focusing said portable electronic microscope to magnify details of surface features of said porcelain item;

viewing said surface features of said porcelain item; and assessing said porcelain item as an antique porcelain item when ascertaining the presence of at least four features selected from the group of features consisting of aging and whitening of glaze bubbles, three-dimensional bubble distribution, significant size variations in bubbles, filamentous bubble patterns, snowflake patterns from whitening bubbles, blackened bubbles, granular texture of glaze and pigments, clam-shell reflection in pigments, wrinkles and cracks, sunken cobalt pigment areas, patina, and crazing and staining of a glaze.

20. A method for identifying and authenticating porcelain, the method comprising the steps of:

providing a portable electronic microscope and a lens for assessing a porcelain item;

providing an electronic computing device having a software application; wherein said portable electronic microscope is connected to said electronic computing device with a wireless communication connection;

activating said portable electronic microscope;

placing said lens over a surface of said porcelain item at an angle from 20 degrees to 40 degrees relative to said porcelain item;

activating said software application;

displaying a live feed from said portable electronic microscope to said electronic computing device;

magnifying details of surface features of said porcelain item;

viewing said surface features of said porcelain item; and assessing said porcelain item as an antique porcelain item when ascertaining the presence of at least four features selected from the group of features consisting of aging and whitening of glaze bubbles, three-dimensional bubble distribution, significant size variations in bubbles, filamentous bubble patterns, snowflake patterns from whitening bubbles, blackened bubbles, granular texture of glaze and pigments, clam-shell reflection in pigments, wrinkles and cracks, sunken cobalt pigment areas, patina, and crazing and staining of a glaze.

* * * * *